A. LINDSTRÖM.
SECONDARY WINDING FOR ASYNCHRONOUS MOTORS.
APPLICATION FILED MAR. 18, 1921.
1,406,566.
Patented Feb. 14, 1922.
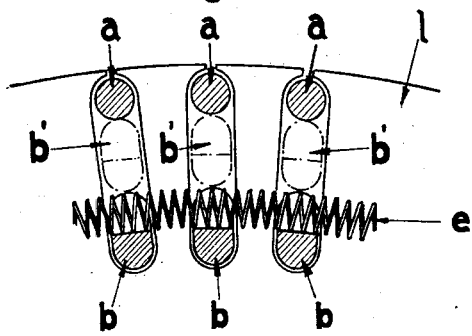
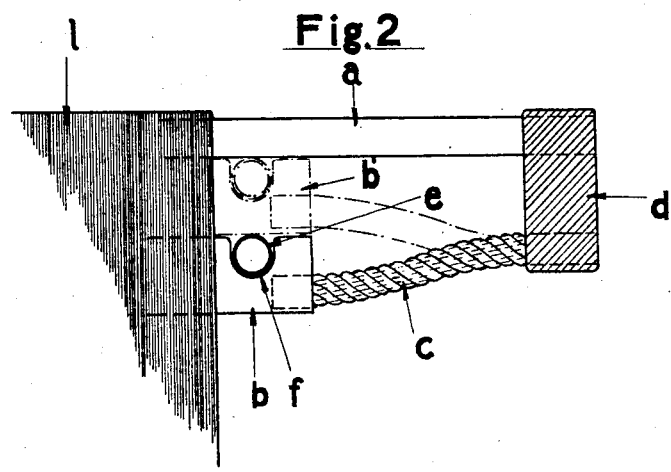
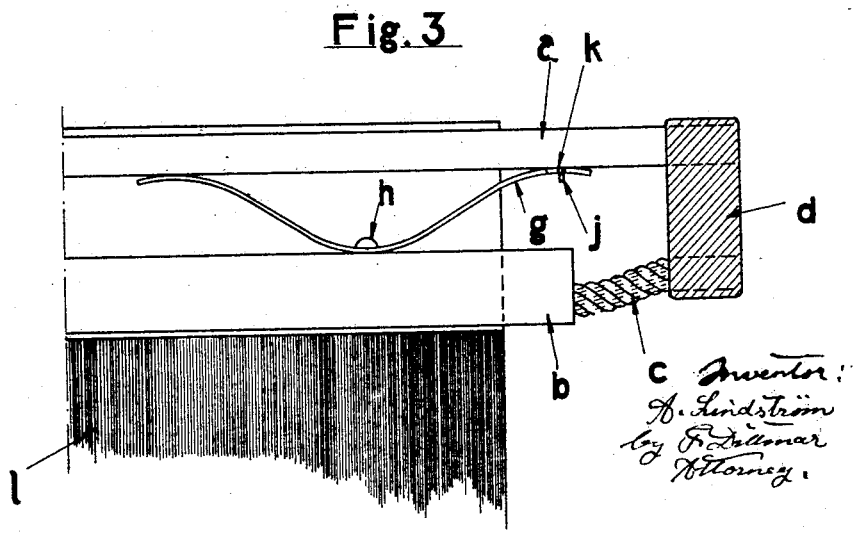

UNITED STATES PATENT OFFICE.

ARVID LINDSTRÖM, OF VESTERÅS, SWEDEN.

SECONDARY WINDING FOR ASYNCHRONOUS MOTORS.

1,406,566.      Specification of Letters Patent.      Patented Feb. 14, 1922.

Application filed March 18, 1921. Serial No. 453,242.

*To all whom it may concern:*

Be it known that I, ARVID LINDSTRÖM, a subject of the King of Sweden, residing at Almelund 3, Vesterås, Sweden, have invented certain new and useful Improvements in Secondary Windings for Asynchronous Motors, of which the following is a specification, reference being had therein to the accompanying drawing.

For increasing the starting torque of induction motors with short-circuited secondary winding (preferably disposed on the rotor), special arrangements of said winding has been employed which consist either in making the slots as well as the conductors deeper than usual or in placing two conductors in the same slot, one in the top and the other in the bottom portion thereof, or finally in providing two rows of slots, one inside the other, with channels between each slot and the underlying one. In all these cases the conductors have been fixed in the slots. The advantage of the described arrangements has, however, been combined with the drawback of a large leakage reactance, causing a low power factor and a small overload capacity at normal speed of the motor.

The present invention has for its purpose to overcome the said disadvantages and consists in making some of the conductors in each slot of the secondary core capable of assuming different radial positions in the slot for different speeds or loads. This change of position is effected automatically or by hand by special means.

It has been proposed in induction motors where all the secondary conductors are not permanently short-circuited to make some of said conductors radially displaceable in their slots for bringing them into contact with short circuiting rings as soon as a certain speed is reached. In counterdistinction from this construction, the present invention relates only to such motors where the entire secondary winding is permanently short-circuited, and which are much more simple and reliable in construction and operation.

Two forms of the invention are illustrated in the accompanying drawing. Fig. 1 shows a portion of a rotor in a cross section taken just outside the iron core and Fig. 2 a longitudinal section of an end portion of the core and winding. Fig. 3 shows a longitudinal section of one half of a slot and adjacent parts with another form of the invention.

In all the figures, 1 is the iron core, $a$ is the fixed conductor in a slot and $b$ the movable one. The fixed conductors are short-circuited in the usual way for instance by means of a ring $d$. The movable conductors have flexible connections $c$, consisting of cables or thin laminations, which are soldered or welded at one end to the conductors and at the other to a common ring which may be the same as that connecting the fixed conductors together. The movable conductors are pressed against the bottom of the slots by spring action when the motor is at rest or rotates slowly. By reason of the leakage in the slot between the two conductors the current then flows mainly through the fixed conductors which produce a strong torque by reason of their comparatively large resistance. When the speed has become sufficiently high, the centrifugal force will overcome the spring action on the movable conductors which are thus pressed out towards the fixed ones so as to lie closely against the latter when full speed has been reached (position $b^1$). The leakage is then small, and the movable conductors contribute fully to the passage of the current and lower the total effective resistance and consequently the slip. In the same time, the power factor and the oveload capacity of the motor will be as great as in a usual squirrel cage motor.

The spring action for pressing the conductors $b$ against the bottom of the slots is effected, in the form shown in Figs. 1 and 2, by coiled spring rings $e$ surrounding the ends of said conductors. The rings preferably engage notches $f$ in the conductors for being kept in place.

In Fig. 3, the spring action is exerted by leaf springs $g$ fixed to the conductors $b$ by means of rivets $h$ and resting against the conductors $a$. The springs may be guided relatively to the latter for instance by means of pins $j$ engaging slots $k$ in the springs.

Having now described the nature of my said invention and the manner of its operation, I declare that what I claim is:—

1. A secondary winding for asynchronous motors comprising two sets of permanently short-circuited conductors one of which is fixed in the iron core while the other is capable of assuming different radial positions during the starting of the motor.

2. A secondary winding for asynchronous motors comprising two sets of permanently short-circuited conductors arranged in the same slots, one conductor in each slot being fixed in the outer portion thereof while another is capable of assuming different radial positions in the slot.

3. In asynchronous motors, a stator having a primary winding, a rotor core having slots, a set of fixed conductors in said slots, a set of radially movable conductors in said slots, resilient members pressing said movable conductors against the bottom of said slots, and short circuiting rings permanently connecting the ends of all the said conductors.

4. In asynchronous motors, a stator having a primary winding, a rotor core having slots, a fixed conductor in the outer portion of each of said slots, a movable conductor in said slot beneath said fixed conductor, spring means separating the two conductors in each slot, and short circuiting rings permanently connecting the ends of said conductors.

5. In asynchronous motors, a stator having a primary winding, a rotor core having slots, a set of fixed conductors in said slots, a set of radially movable conductors in said slots, resilient members holding the ends of said movable conductors together, and short circuiting rings permanently connecting the ends of said fixed and movable conductors.

In testimony whereof I have affixed my signature in the presence of two witnesses.

ARVID LINDSTRÖM.

Witnesses:
 BIEGER NORFELDT,
 OLVA BORG.